United States Patent
Menthe

[11] Patent Number: 5,911,559
[45] Date of Patent: Jun. 15, 1999

[54] AIRFOILED BLADE FOR A PROPELLER

[75] Inventor: Robert W. Menthe, South Windsor, Conn.

[73] Assignee: United Technologies Corporation, Windsor Locks, Conn.

[21] Appl. No.: 08/931,406

[22] Filed: Sep. 16, 1997

[51] Int. Cl.[6] .................................................. B63H 1/26
[52] U.S. Cl. ..................... 416/223 R; 416/242; 416/243
[58] Field of Search ............................... 416/223 R, 242, 416/243, DIG. 5

[56] References Cited

U.S. PATENT DOCUMENTS

| | | | |
|---|---|---|---|
| 4,519,746 | 5/1985 | Wainauski et al. | 416/223 R |
| 4,652,213 | 3/1987 | Thibert et al. | 416/223 R |
| 4,773,825 | 9/1988 | Rodde et al. | 416/223 R |
| 4,830,574 | 5/1989 | Wainauski et al. | 416/223 R |
| 4,834,617 | 5/1989 | Wainauski et al. | 416/242 |
| 4,941,803 | 7/1990 | Wainauske et al. | 416/242 |
| 5,791,878 | 8/1998 | Wainauski et al. | 416/223 R |

*Primary Examiner*—F. Daniel Lopez
*Assistant Examiner*—Ninh Nguyen

[57] ABSTRACT

An airfoiled blade for improving the performance of a propeller at low aircraft speeds and for maintaining good performance of the propeller at high aircraft speeds is disclosed. The blade comprises a root portion for connection to a hub of the propeller and a tip portion defining an opposite end of the root portion. An elongated portion extends between the base portion and the tip portion and defines a leading edge and a trailing edge. The elongated portion has a cross-section defined by a scaleable airfoil section. The scaleable airfoil section comprises a chord having a fifty-percent chord station, a forward end defining the leading edge of the blade and an aft end defining the trailing edge. The airfoil section is aft end loaded for developing aft end lift. The scaleable airfoil section also has a camber distribution and a thickness distribution based therefrom. The thickness distribution defines an upper surface and a pressure surface, wherein the thickness distribution has a maximum location substantially forwardly positioned relative the fifty-percent chord station and toward the leading edge. The upper surface is designed to delay mach number build-up thereon and flow separation on the airfoil and the pressure surface is designed to prevent premature flow separation at cruise lift coefficients.

13 Claims, 3 Drawing Sheets

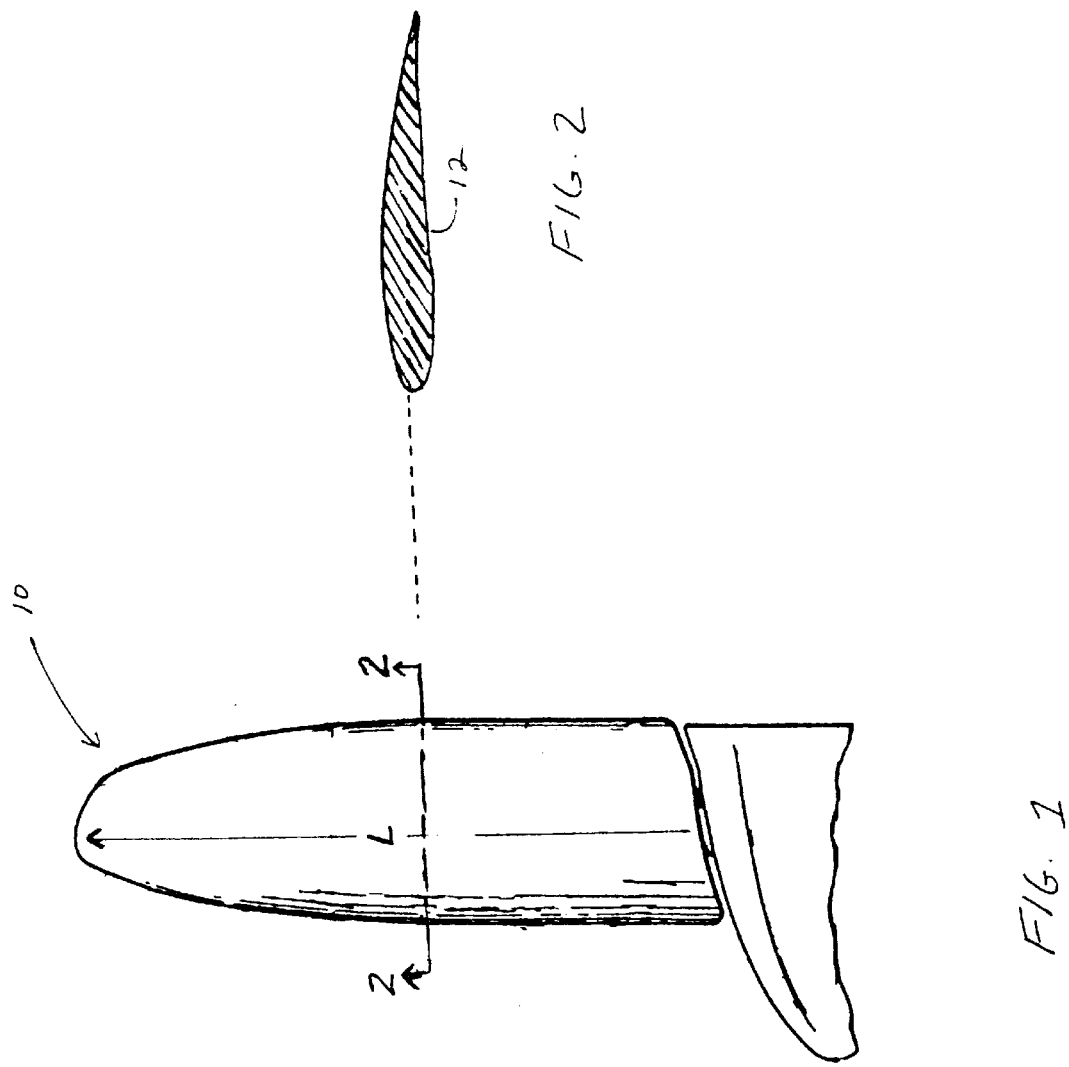

AIRFOILED BLADE FOR A PROPELLER

TECHNICAL FIELD

This invention is directed to airfoiled propeller blades, and more particularly, to an improved airfoiled blade which provides for improved performance of the propeller at low aircraft speeds while maintaining efficient performance at cruise speeds.

BACKGROUND ART

The prior art includes a plurality of airfoiled blades for various applications. Such applications include blades specifically designed to reduce weight, blades specifically designed for use with commuter aircraft, and thin swept blades for reliable high speed performance.

For aircraft which use high speed turbo props, typical airfoiled blades available today allow for good cruise performance, but fall short on performance of the propeller at low aircraft speeds. Such shortcomings are essentially due to the failure of the industry to specifically design an airfoil for high speed turbo props which allows for improved performance of the propeller at low aircraft speeds while still maintaining good cruise performance at high speed. An airfoil design that can provide these characteristics would enhance the overall performance of the propeller blade and the aircraft.

Currently available airfoiled blades for aircraft include those shown in U.S. Pat. No. 4,830,574 to Wainauski et al, which discloses an airfoiled blade directed to minimizing propeller weight by utilizing narrow chord blades; U.S. Pat. No. 4,834,617 to Wainauski, which discloses an airfoiled blade which is thin swept having its application as a prop fan with high tip speed and mach numbers; U.S. Pat. No. 4,941,803 to Wainauski et al, which discloses an airfoiled blade designed for high loading and high efficiency at relatively high mach numbers; and U.S. Pat. No. 4,519,746 to Wainauski et al which discloses an airfoiled blade which is directed for use with commuter aircraft. As indicated in the above patents, none of these airfoil designs address the dual considerations of efficiency at low speed and at cruise speeds, both of which are associated with modern high speed turbo props.

There exists a need, therefore, for a new airfoil design for use with modern high speed turbo props, which perform efficiently at low aircraft speeds while also maintaining good performance at the high cruise speeds associated with the modern high speed turbo prop.

DISCLOSURE OF THE INVENTION

The primary object of this invention is to provide an improved airfoil for a propeller blade used with modern high speed turbo props.

Another object of this invention is to provide an airfoil which can be scaled independently in both camber and thickness airfoil for a propeller blade used with high speed turbo props, which blade has an airfoil shape which allows for efficient performance of the propeller thereof at low aircraft speeds while maintaining good cruise performance of the propeller at the high aircraft speeds.

Still another object of this invention is to provide an improved airfoil for a propeller blade for use with modern high speed turboprops, which is aft loaded for reducing leading edge flow separation and provides high lift at low speeds and low lift at high speeds, thereby increasing the performance characteristics of the blade associated therewith.

And still another object of this invention is to provide an airfoil with a blunt nose to increase the resistance of the propeller blade to foreign object damage.

The foregoing objects and following advantages are achieved by the airfoiled blade of the present invention for improving the performance of a propeller at low aircraft speeds and for maintaining good performance of the propeller at high aircraft speeds is disclosed.

The blade comprises a root portion for connection to a hub of the propeller and a tip portion defining an opposite and of the root portion. An elongated portion extends between the base portion and the tip portion and defines a leading edge and a trailing edge, The elongated portion has a cross-section defined by a scaleable airfoil section. The scaleable airfoil section comprises a chord having a fifty-percent chord station, a forward end defining the leading edge of the blade and an aft end defining the trailing edge. The airfoil section is aft end loaded for developing aft end lift. The scaleable airfoil section also has a camber distribution and a thickness distribution based therefrom. The thickness distribution defines an upper surface and a pressure surface, wherein the thickness distribution has a maximum location substantially forwardly positioned relative the fifty-percent chord station and toward the leading edge. The upper surface is designed to delay mach number build-up thereon and flow separation on the airfoil and the pressure surface is designed to prevent premature flow separation at cruise lift coefficients.

BEST MODE FOR CARRYING OUT THE INVENTION

Figure 1:
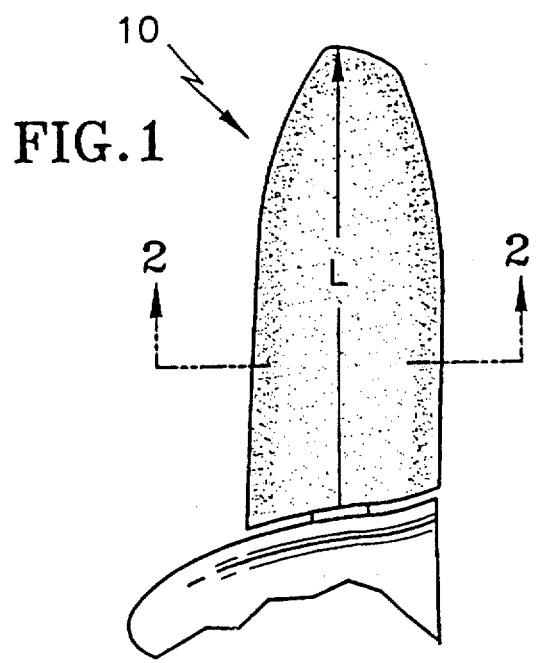
FIG. 1 is an elevational view of an airfoiled blade having a scaleable airfoil in accordance with the principles of the present invention.

Referring now to the drawings in detail, there is shown in FIG. 1, and airfoiled blade in accordance with the principles of the present invention, designated generally as 10. Blade 10 includes a scaleable airfoil section 12 having the shape shown in the accompanying cross section view, FIG. 2, of the blade. Since airfoiled section 12 is scaleable over the entire length L of blade 10, the basic dimensionless parameters, as provided in the table below, can be scaled, in a manner known in the art, to generate the exact airfoils comprising the entire length of blade 10. The following table lists precise dimensionless coordinates of the airfoil section, wherein x/c=dimensionless chordlength defining locations of points on the chord c, wherein x/c defines the distance along the chord c, divided by the length of the chord;

y/c=the dimensionless height of the camber line $C_L$ from the chord c; and t/c=the dimensionless thickness distribution defining the height of the upper surface and pressure surface from the camber line $C_L$, wherein the heights to the upper and pressure surfaces are substantially equal for particular dimensionless locations x/c along chord c.

The dimensionless parameters of the airfoil section are provided in Table I, as follows:

Camber and Thickness Distributions

| x/c | y/c | t/c |
|---|---|---|
| 0.00E + 00 | −2.72E-03 | 0.00E + 00 |
| 6.55E-04 | −2.44E-03 | 2.80E-03 |
| 3.64E-03 | −1.07E-03 | 8.60E-03 |
| 8.05E-03 | 1.24E-03 | 1.23E-02 |
| 1.38E-02 | 3.02E-03 | 1.55E-02 |
| 2.06E-02 | 5.16E-03 | 1.85E-02 |
| 2.85E-02 | 7.45E-03 | 2.14E-02 |
| 3.73E-02 | 9.60E-03 | 2.41E-02 |
| 4.69E-02 | 1.15E-02 | 2.66E-02 |
| 5.72E-02 | 1.33E-02 | 2.88E-02 |
| 6.79E-02 | 1.50E-02 | 3.08E-02 |
| 7.87E-02 | 1.65E-02 | 3.25E-02 |
| 8.97E-02 | 1.78E-02 | 3.41E-02 |
| 0.100981 | 1.90E-02 | 3.54E-02 |
| 0.112404 | 2.00E-02 | 3.66E-02 |
| 0.123961 | 2.10E-02 | 3.75E-02 |
| 0.135591 | 2.20E-02 | 3.83E-02 |
| 0.147264 | 2.29E-02 | 3.90E-02 |
| 0.158984 | 2.37E-02 | 3.95E-02 |
| 0.17076 | 2.45E-02 | 4.00E-02 |
| 0.182586 | 2.53E-02 | 4.03E-02 |
| 0.194457 | 2.61E-02 | 4.06E-02 |
| 0.206372 | 2.68E-02 | 4.07E-02 |
| 0.218324 | 2.76E-02 | 4.08E-02 |
| 0.230306 | 2.83E-02 | 4.09E-02 |
| 0.242309 | 2.91E-02 | 4.09E-02 |
| 0.254329 | 2.98E-02 | 4.08E-02 |
| 0.266359 | 3.06E-02 | 4.07E-02 |
| 0.278397 | 3.14E-02 | 4.05E-02 |
| 0.290436 | 3.22E-02 | 4.03E-02 |
| 0.302475 | 3.30E-02 | 4.01E-02 |
| 0.314511 | 3.38E-02 | 3.99E-02 |
| 0.326543 | 3.46E-02 | 3.96E-02 |
| 0.338571 | 3.54E-02 | 3.93E-02 |
| 0.350593 | 3.62E-02 | 3.90E-02 |
| 0.362606 | 3.72E-02 | 3.85E-02 |
| 0.374613 | 3.81E-02 | 3.81E-02 |
| 0.386625 | 3.91E-02 | 3.77E-02 |
| 0.398648 | 4.01E-02 | 3.73E-02 |
| 0.410668 | 4.09E-02 | 3.68E-02 |
| 0.422656 | 4.15E-02 | 3.64E-02 |
| 0.434597 | 4.22E-02 | 3.59E-02 |
| 0.446491 | 4.27E-02 | 3.55E-02 |
| 0.458355 | 4.35E-02 | 3.50E-02 |
| 0.47022 | 4.40E-02 | 3.45E-02 |
| 0.482129 | 4.44E-02 | 3.40E-02 |
| 0.494099 | 4.49E-02 | 3.35E-02 |
| 0.506116 | 4.52E-02 | 3.29E-02 |
| 0.518138 | 4.57E-02 | 3.23E-02 |
| 0.530137 | 4.60E-02 | 3.18E-02 |
| 0.542107 | 4.62E-02 | 3.13E-02 |
| 0.554058 | 4.63E-02 | 3.07E-02 |
| 0.566002 | 4.65E-02 | 3.02E-02 |
| 0.577942 | 4.66E-02 | 2.96E-02 |
| 0.589886 | 4.66E-02 | 2.91E-02 |
| 0.601843 | 4.66E-02 | 2.85E-02 |
| 0.613812 | 4.65E-02 | 2.80E-02 |
| 0.625788 | 4.65E-02 | 2.74E-02 |
| 0.637758 | 4.64E-02 | 2.69E-02 |
| 0.649719 | 4.63E-02 | 2.64E-02 |
| 0.66167 | 4.61E-02 | 2.58E-02 |
| 0.673615 | 4.58E-02 | 2.53E-02 |
| 0.685561 | 4.55E-02 | 2.48E-02 |
| 0.697505 | 4.52E-02 | 2.43E-02 |
| 0.709449 | 4.47E-02 | 2.38E-02 |
| 0.721386 | 4.42E-02 | 2.33E-02 |
| 0.733315 | 4.36E-02 | 2.27E-02 |
| 0.745236 | 4.30E-02 | 2.22E-02 |
| 0.757151 | 4.23E-02 | 2.17E-02 |
| 0.769062 | 4.15E-02 | 2.12E-02 |
| 0.78097 | 4.06E-02 | 2.07E-02 |

-continued

Camber and Thickness Distributions

| x/c | y/c | t/c |
|---|---|---|
| 0.792873 | 3.96E-02 | 2.02E-02 |
| 0.80477 | 3.86E-02 | 1.97E-02 |
| 0.81666 | 3.75E-02 | 1.92E-02 |
| 0.828541 | 3.63E-02 | 1.86E-02 |
| 0.840411 | 3.50E-02 | 1.81E-02 |
| 0.852269 | 3.36E-02 | 1.76E-02 |
| 0.864107 | 3.20E-02 | 1.70E-02 |
| 0.875922 | 3.04E-02 | 1.65E-02 |
| 0.887706 | 2.87E-02 | 1.59E-02 |
| 0.899452 | 2.68E-02 | 1.53E-02 |
| 0.911153 | 2.48E-02 | 1.47E-02 |
| 0.922797 | 2.26E-02 | 1.40E-02 |
| 0.934361 | 2.03E-02 | 1.33E-02 |
| 0.945811 | 1.77E-02 | 1.25E-02 |
| 0.957096 | 1.49E-02 | 1.17E-02 |
| 0.968133 | 1.19E-02 | 1.08E-02 |
| 0.978789 | 8.66E-03 | 9.85E-03 |
| 0.988888 | 5.28E-03 | 8.86E-03 |
| 1 | 1.82E-03 | 7.88E-03 |

The airfoil section 12 has a maximum thickness distribution of substantially $t/c_{MAX}=0.040$ and a design lift coefficient CLD=0.450.

Depending upon the particular application of the blade, as to the particular type of aircraft it is being used on, the speed of the aircraft, the RPM of the aircraft engine, etc, these table parameters can be scaled to provide an airfoiled blade having the required thickness, from a strength standpoint, and angular displacement, from a blade size and RPM standpoint. That is, multiple scaled airfoil sections as defined by the generic parameters set forth in Table I are connected by transitional surfaces which connect the corresponding portions between any two adjacent airfoils, as is well known in the art. As indicated, the airfoil sections will be angularly displaced from one another in a manner well known in the art to impart sufficient twist to the blade to establish varying blade angles of attack dictated by aerodynamic performance requirements.

Figure 3:
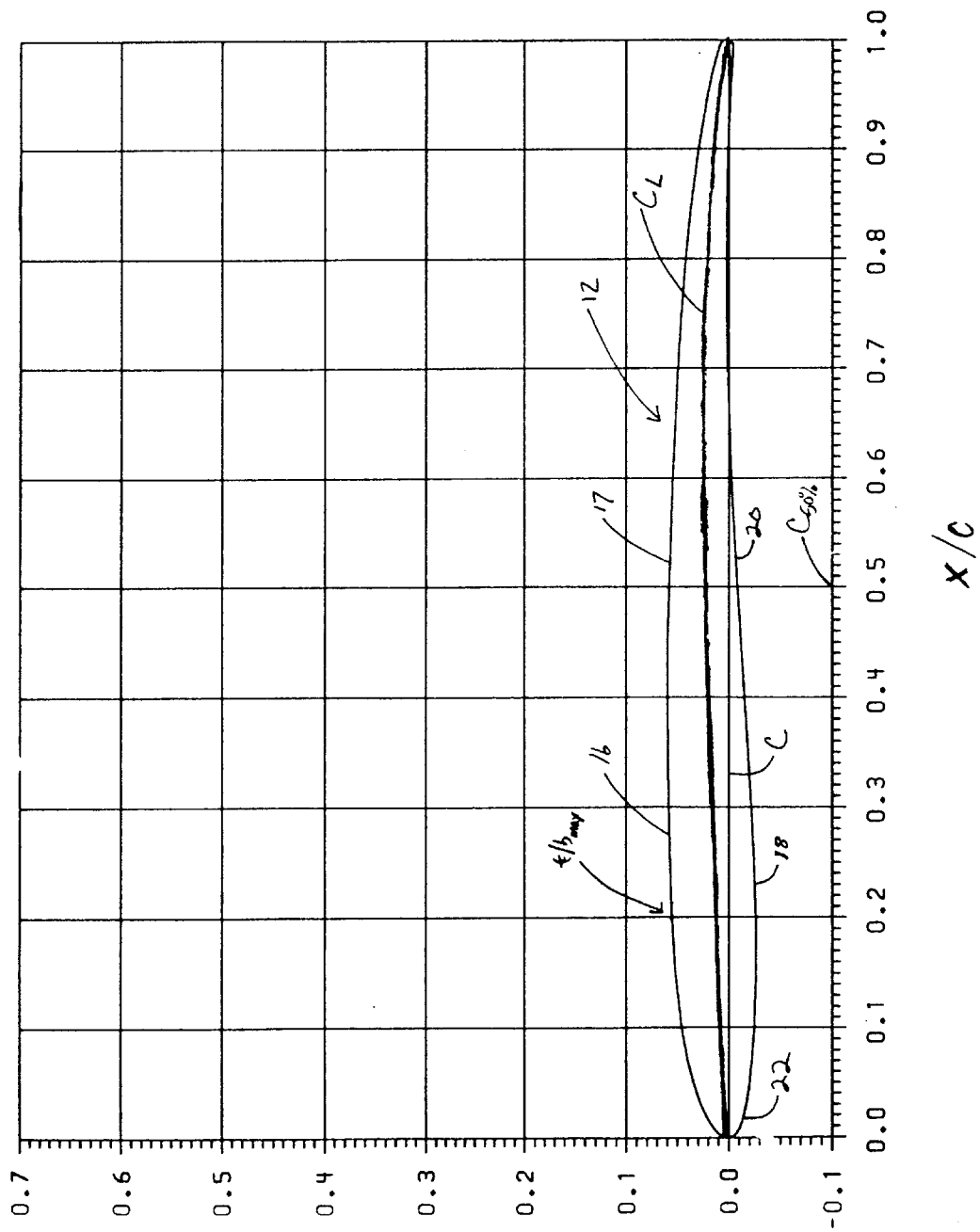
FIG. 3 is a graphical representation of the airfoil section of the present invention in which the dimensionless parameters y/c and x/c are plotted for forming the airfoil.
Figure 2:
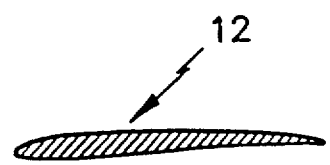
FIG. 2 is a cross-sectional view taken along line 2—2 of FIG. 1 showing the scaleable airfoil shape in accordance with the principles of the present invention, which is used to define the blade shown in FIG. 1.
Figure 3:
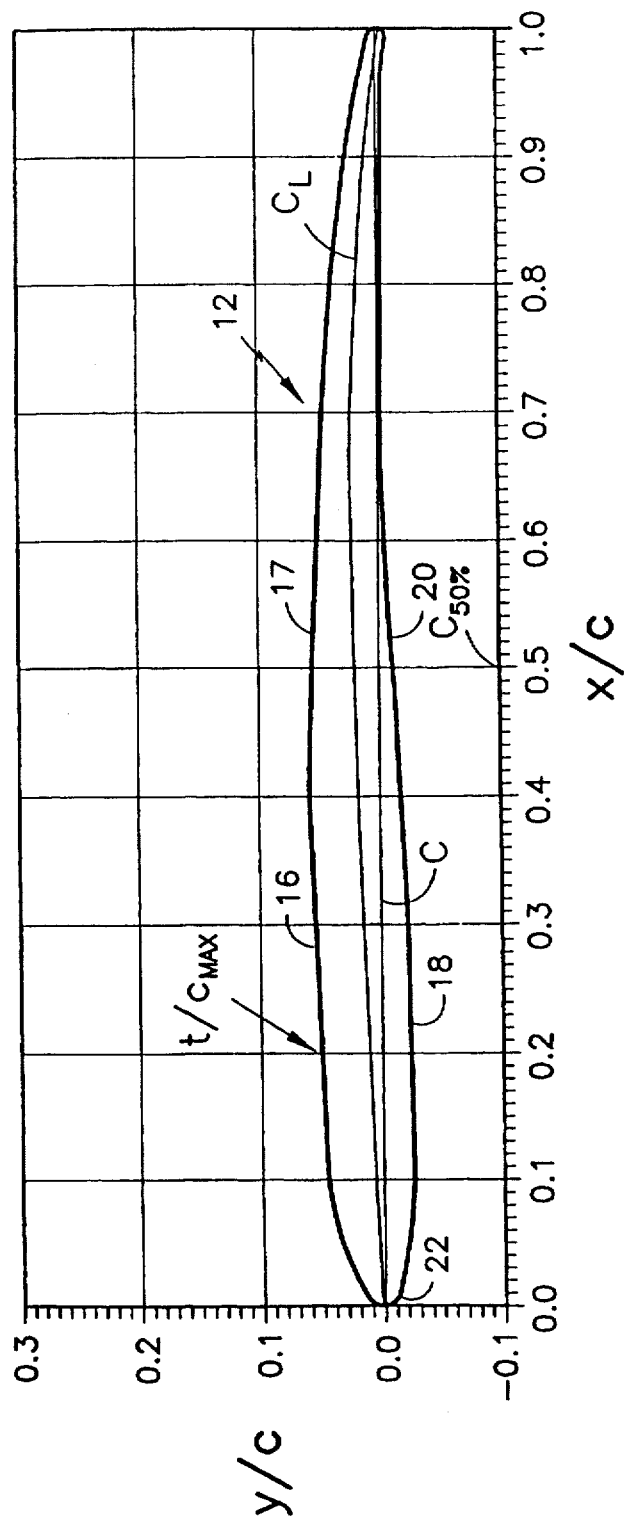
Figure 4:
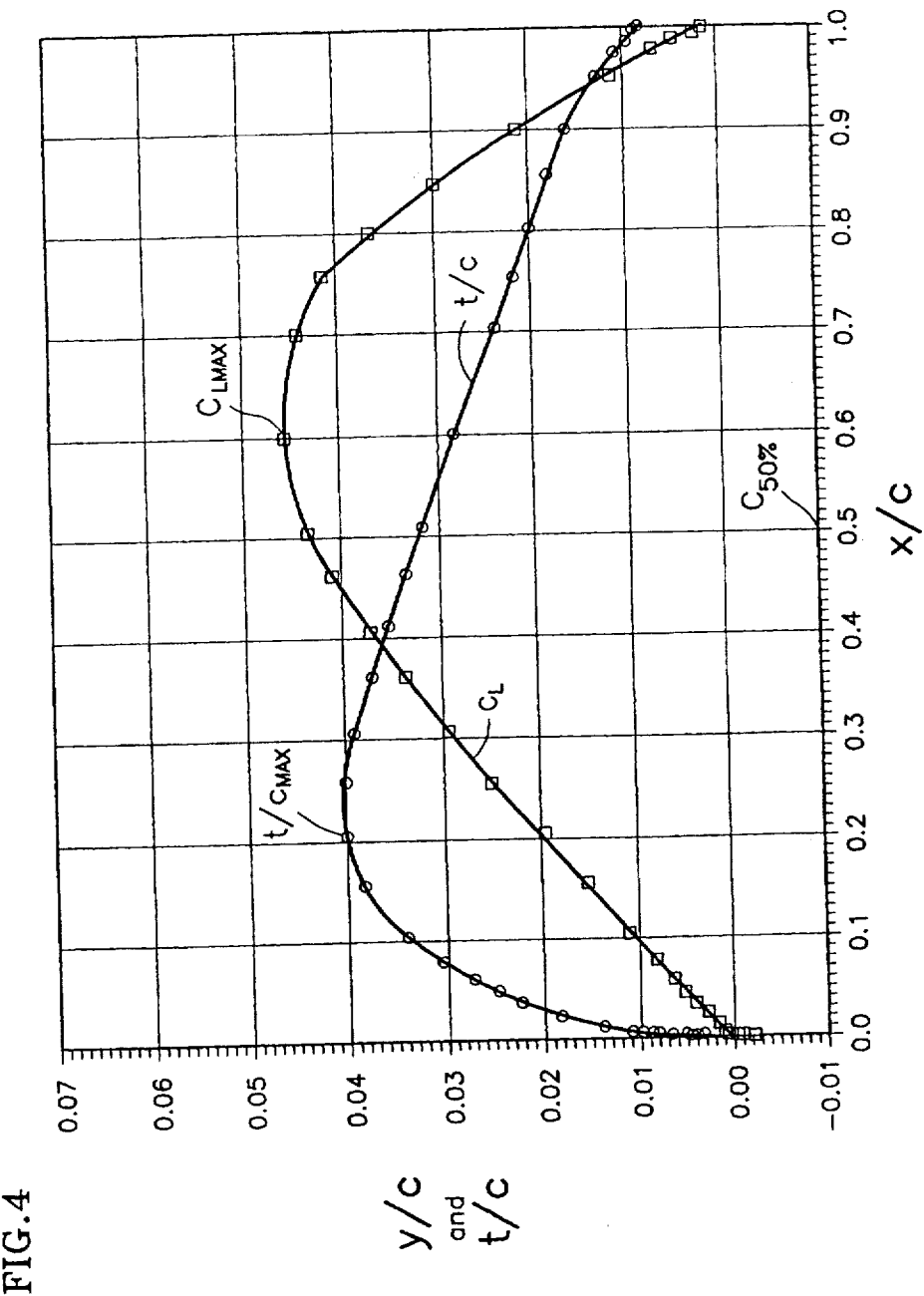

Referring now to FIG. 3, a more detailed view of the airfoil section shown in FIGS. 1 and 2, is shown. Airfoil section 12 has a flat surface 16 on upper surface 17 for delaying mach number build up by slowing air acceleration. The flat surface is defined substantially between the x/c coordinates of 0.1 and 0.4, or 10% and 40% chord stations. Flat surface 16 is forward, toward the leading edge, of the 50% chord station $C_{50\%}$. Airfoil section 12 also includes a flat surface 18 on pressure surface 20 thereof, substantially between the 0.1 and 0.3 x/c coordinates, or 10% and 30% chord stations, also forward of the 50% chord station $C_{50\%}$. This flat surface 18 on pressure surface 20 provides for enhanced performance at cruise speed by preventing premature separation on the pressure surface at cruise lift coefficients. The upper surface 17 of the airfoil section is formed by adding the thickness distribution to the camber distribution given in the table above, and lower or pressure surface 20 is formed by subtracting the thickness distribution from the camber distribution. Also referring to FIG. 3, airfoil section 12 also has a blunt nose or leading edge 22 which improves foreign object damage tolerance and more specifically, which has a parabolic shape. As indicated most particularly in FIG. 3 and as shown in the graph of FIG. 4, the thickness distribution of the airfoil section 12 peaks forward of $C_{50\%}$, at $t/c_{MAX}$, at substantially the 20% chord station or at x/c=to 0.2.

Figure 4:
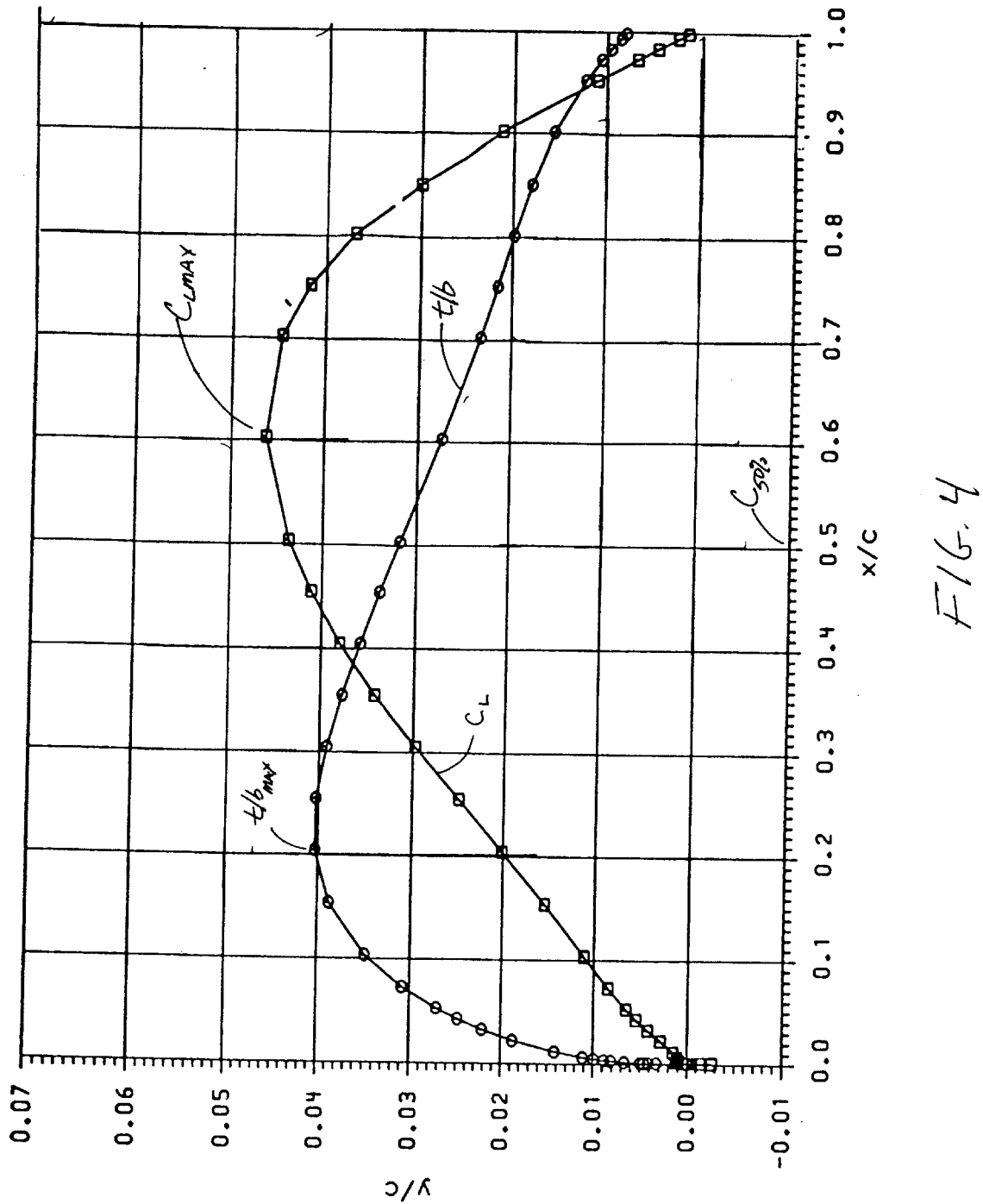
FIG. 4 is a higher definition plot of y/c versus x/c for each of the thickness and camber distributions.

As indicated by the graph in FIG. 4, the airfoil section 12 of the present invention is aft loaded, as indicated by camber line $C_L$ and the location of maximum camber $C_{LMAX}$ aft of $C_{50\%}$, at substantially the 60% chord station, so as to reduce airfoil flow separation and noise as well as provide high lift at low speeds and low lift at high speeds.

In accordance with these dimensionless parameters, propeller blades can be configured and designed for use with both high speed and low speed aircraft, allowing for improved performance of propellers at low aircraft speeds and still maintaining good cruise performance at cruise aircraft speeds encountered by modern high speed turbo props. The actual construction of an airfoiled propeller blade having airfoil sections corresponding to the dimensionless parameters provided above in Table I can be accomplished using known manufacturing techniques.

The particular blade described above having scaleable airfoil section 12 as described is designed to cruise optically at about Mach 0.5 to 0.75. However, as is typical with scaleable airfoil sections, the camber and thickness of each section can be adjusted to achieve optimum blade loading for other desired blade loading profiles. Each thickness may utilize the described camber line or any of a series of scaled camber lines having an apogee at about 1.0.

The primary advantage of this invention is that an improved airfoil for a propeller blade used with modem high speed turbo props is provided.

Another advantage of this invention is that a scaleable airfoil for a propeller blade is provided for use with high speed turbo props, which blade has an airfoil shape which allows for efficient performance of the propeller thereof at low aircraft speeds while maintaining good cruise performance of the propeller at the high aircraft speeds turboprops. Still another advantage of this invention is that an improved airfoil blade in a propeller is provided for use with modem high speed turboprops, which blade is aft loaded for reducing flow separation and airfoil nose, and provides high lift at low speeds and low lift at high speeds, thereby increasing the performance characteristics of the propeller associated therewith. And still another advantage of this invention is that an airfoil with a blunt nose is provided to increase the resistance of the propeller blade to foreign object damage.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

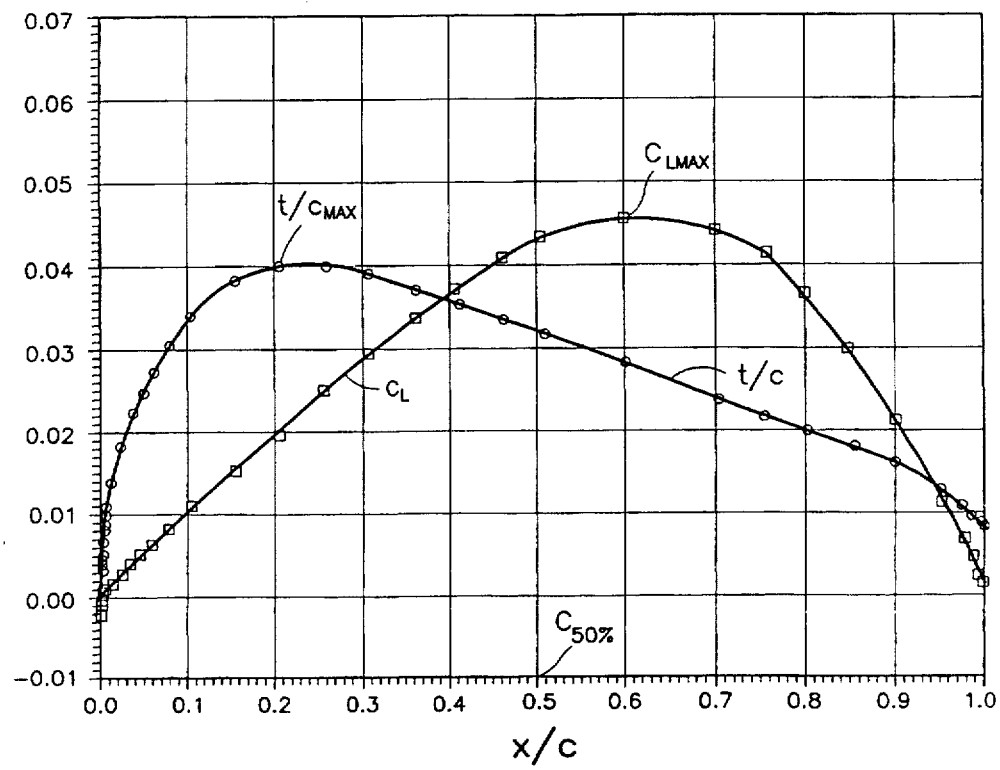

I claim:

1. An airfoiled blade for improving the performance of a propeller at low aircraft speeds and for maintaining good performance of the propeller at high aircraft speeds, comprising:

a root portion for connection to a hub of the propeller and a tip portion defining an opposite end of said root portion; and an elongated portion extending between said root portion and said tip portion and defining a leading edge and a trailing edge, wherein said elongated portion has a cross-section defined by a scaleable airfoil section, wherein said scaleable airfoil section comprises:

a chord having a fifty-percent chord station;

a forward end defining said leading edge of the blade and an aft end defining said trailing edge, wherein said airfoil section is aft end loaded for developing aft end lift;

a camber distribution;

a thickness distribution based from said camber distribution, said thickness distribution defining an upper surface and a pressure surface and having a maximum location substantially forwardly positioned relative said fifty-percent chord station, toward said leading edge, wherein said upper surface includes means for delaying mach number build-up thereon and flow separation on the airfoil and wherein said pressure surface includes means for preventing premature flow separation at cruise lift coefficients wherein said means for delaying comprises a flat surface forwardly positioned relative said fifty-percent chord station and toward said leading edge on said upper surface.

2. The airfoiled blade according to claim 1, wherein said flat surface is positioned substantially between a ten and a forty percent chord station of said chord on said upper surface.

3. The airfoiled blade according to claim 1, wherein said means for preventing comprises a flat surface forwardly positioned relative said fifty-percent chord station and toward said leading edge on said pressure surface.

4. The airfoiled blade according to claim 3, wherein said flat surface is positioned substantially between a ten and a thirty percent chord station of said chord on said pressure surface.

5. The airfoiled blade according to claim 1, wherein said leading edge comprises means for improving foreign object damage tolerances.

6. The airfoiled blade according to claim 5, wherein said means for improving comprises said leading edge having a parabolic shape.

7. The airfoiled blade according to claim 1, wherein said camber distribution has a maximum camber location aft of said fifty-percent chord station so as to reduce airfoil flow separation and noise and provide high lift at low speeds and low lift at high speeds.

8. The airfoiled blade according to claim 7, wherein said maximum camber location is at substantially a sixty percent chord station of said chord toward said trailing edge.

9. The airfoiled blade according to claim 1, wherein said maximum location of said thickness distribution is at substantially a twenty percent chord station of said chord toward said leading edge.

10. An airfoiled blade for improving the performance of a propeller at low aircraft speeds and for maintaining good performance of the propeller at high aircraft speeds, comprising:

a root portion for connection to a hub of the propeller and a tip portion defining an opposite end of said root portion; and an elongated portion extending between said root portion and said tip portion and defining a leading edge and a trailing edge, wherein said elongated portion has a cross-section defined by a scaleable airfoil section, wherein said scaleable airfoil section comprises:

a chord having a fifty-percent chord station;

a forward end defining said leading edge of the blade and an aft end defining said trailing edge, wherein said airfoil section is aft end loaded for developing aft end lift;

a camber distribution;

a thickness distribution based from said camber distribution, said thickness distribution defining an upper surface and a pressure surface and having a maximum location substantially forwardly positioned relative said fifty-percent chord station, toward said leading edge, wherein said upper surface includes means for delaying mach number build-up thereon and flow separation on the airfoil and wherein said pressure surface includes means for preventing premature flow separation at cruise lift coefficients, wherein said means for preventing comprises a flat surface forwardly positioned relative said fifty-percent chord station and toward said leading edge on said pressure surface.

11. The airfoiled blade according to claim 10 wherein said flat surface is positioned substantially between a ten and a thirty percent chord station of said chord on said pressure surface.

12. An airfoiled blade for improving the performance of a propeller at low aircraft speeds and for maintaining good performance of the propeller at high aircraft speeds, comprising:

a root portion for connection to a hub of the propeller and a tip portion defining an opposite end of said root portion; and an elongated portion extending between said root portion and said tip portion and defining a leading edge and a trailing edge, wherein said elongated portion has a cross-section defined by a scaleable airfoil section, wherein said scaleable airfoil section comprises:
a chord having a fifty-percent chord station;
a forward end defining said leading edge of the blade and an aft end defining said trailing edge, wherein said airfoil section is aft end loaded for developing aft end lift;
a camber distribution;
a thickness distribution based from said camber distribution, said thickness distribution defining an upper surface and a pressure surface and having a maximum location substantially forwardly positioned relative said fifty-percent chord station, toward said leading edge, wherein said upper surface includes means for delaying mach number build-up thereon and flow separation on the airfoil and wherein said pressure surface includes means for preventing premature flow separation at cruise lift coefficients wherein said maximum location of said thickness distribution is at substantially a twenty percent chord station of said chord toward said leading edge.

13. An airfoiled blade for improving the performance of a propeller at low aircraft speeds and for maintaining good performance of the propeller at high aircraft speeds, comprising:

a root portion for connection to a hub of the propeller and a tip portion defining an opposite end of said root portion; and an elongated portion extending between said root portion and said tip portion and defining a leading edge, a trailing edge, an upper surface, and a pressure surface wherein said elongated portion has a cross-section defined by a scaleable airfoil section, wherein said scaleable airfoil section comprises:
a chord having a fifty-percent chord station;
a forward end defining said leading edge of the blade and an aft end defining said trailing edge, wherein said airfoil section is aft end loaded for developing aft end lift;
a camber distribution; and,
a thickness distribution wherein x/c is a dimensionless chordlength defining locations of points on said chord, wherein x/c defines the distance along the chord c, divided by the length of the chord, wherein y/c is a dimensionless height of said camber distribution from said chord, and wherein t/c is a dimensionless thickness distribution defining a height of said upper surface and said pressure surface from said camber distribution wherein said heights to said upper and said pressure surfaces are substantially equal for said dimensionless locations x/c along said chord, wherein said y/c, t/c, and x/c are represented by the values

| x/c | y/c | t/c |
| --- | --- | --- |
| 0.00E + 00 | −2.72E-03 | 0.00E + 00 |
| 6.55E-04 | −2.44E-03 | 2.80E-03 |
| 3.64E-03 | −1.07E-03 | 8.60E-03 |
| 8.05B-03 | 1.24E-03 | 1.23E-02 |
| 1.38E-02 | 3.02E-03 | 1.55E-02 |
| 2.06E-02 | 5.16E-03 | 1.85E-02 |
| 2.85E-02 | 7.45E-03 | 2.14E-02 |
| 3.73E-02 | 9.60E-03 | 2.41E-02 |
| 4.69E-02 | 1.15E-02 | 2.66E-02 |
| 5.72E-02 | 1.33E-02 | 2.88E-02 |
| 6.79E-02 | 1.50E-02 | 3.08E-02 |
| 7.87E-02 | 1.65E-02 | 3.25E-02 |
| 8.97E-02 | 1.78E-02 | 3.41E-02 |
| 0.100981 | 1.90E-02 | 3.54E-02 |
| 0.112404 | 2.00E-02 | 3.66E-02 |
| 0.123961 | 2.10E-02 | 3.75E-02 |
| 0.135591 | 2.20E-02 | 3.83E-02 |
| 0.147264 | 2.29E-02 | 3.90E-02 |
| 0.158984 | 2.37E-02 | 3.95E-02 |
| 0.17076 | 2.45E-02 | 4.00E-02 |
| 0.182586 | 2.53E-02 | 4.03E-02 |
| 0.194457 | 2.61E-02 | 4.06E-02 |
| 0.206372 | 2.68E-02 | 4.07E-02 |
| 0.218324 | 2.76E-02 | 4.08E-02 |
| 0.230306 | 2.83E-02 | 4.09E-02 |
| 0.242309 | 2.91E-02 | 4.09E-02 |
| 0.254329 | 2.98E-02 | 4.08E-02 |
| 0.266359 | 3.06E-02 | 4.07E-02 |
| 0.278397 | 3.14E-02 | 4.05E-02 |
| 0.290436 | 3.22E-02 | 4.03E-02 |
| 0.302475 | 3.30E-02 | 4.01E-02 |
| 0.314511 | 3.38E-02 | 3.99E-02 |
| 0.326543 | 3.46E-02 | 3.96E-02 |
| 0.338571 | 3.54E-02 | 3.93E-02 |
| 0.350593 | 3.62E-02 | 3.90E-02 |
| 0.362606 | 3.72E-02 | 3.85E-02 |
| 0.374613 | 3.81E-02 | 3.81E-02 |
| 0.386625 | 3.91E-02 | 3.77E-02 |
| 0.398648 | 4.01E-02 | 3.73E-02 |
| 0.410668 | 4.09E-02 | 3.68E-02 |
| 0.422656 | 4.15E-02 | 3.64E-02 |
| 0.434597 | 4.22E-02 | 3.59E-02 |
| 0.446491 | 4.27E-02 | 3.55E-02 |
| 0.458355 | 4.35E-02 | 3.50E-02 |
| 0.47022 | 4.40E-02 | 3.45E-02 |
| 0.482129 | 4.44E-02 | 3.40E-02 |
| 0.494099 | 4.49E-02 | 3.35E-02 |
| 0.506116 | 4.52E-02 | 3.29E-02 |
| 0.518138 | 4.57E-02 | 3.23E-02 |
| 0.530137 | 4.60E-02 | 3.18E-02 |
| 0.542107 | 4.62E-02 | 3.13E-02 |
| 0.554058 | 4.63E-02 | 3.07E-02 |
| 0.566002 | 4.65E-02 | 3.02E-02 |
| 0.577942 | 4.66E-02 | 2.96E-02 |
| 0.589886 | 4.66E-02 | 2.91E-02 |
| 0.601843 | 4.66E-02 | 2.85E-02 |
| 0.613812 | 4.65E-02 | 2.80E-02 |
| 0.625788 | 4.65E-02 | 2.74E-02 |
| 0.637758 | 4.64E-02 | 2.69E-02 |
| 0.649719 | 4.63E-02 | 2.64E-02 |
| 0.66167 | 4.61E-02 | 2.58E-02 |
| 0.673615 | 4.58E-02 | 2.53E-02 |
| 0.685561 | 4.55E-02 | 2.48E-02 |
| 0.697505 | 4.52E-02 | 2.43E-02 |
| 0.709449 | 4.47E-02 | 2.38E-02 |
| 0.721386 | 4.42E-02 | 2.33E-02 |
| 0.733315 | 4.36E-02 | 2.27E-02 |
| 0.745236 | 4.30E-02 | 2.22E-02 |

| x/c | y/c | t/c |
|---|---|---|
| 0.757151 | 4.23E-02 | 2.17E-02 |
| 0.769062 | 4.15E-02 | 2.12E-02 |
| 0.78097 | 4.06E-02 | 2.07E-02 |
| 0.792873 | 3.96E-02 | 2.02E-02 |
| 0.80477 | 3.86E-02 | 1.97E-02 |
| 0.81666 | 3.75E-02 | 1.92E-02 |
| 0.828541 | 3.63E-02 | 1.86E-02 |
| 0.840411 | 3.50E-02 | 1.81E-02 |
| 0.852269 | 3.36E-02 | 1.76E-02 |
| 0.864107 | 3.20E-02 | 1.70E-02 |
| 0.875922 | 3.04E-02 | 1.65E-02 |
| 0.887706 | 2.87E-02 | 1.59E-02 |
| 0.899452 | 2.68E-02 | 1.53E-02 |
| 0.911153 | 2.48E-02 | 1.47E-02 |
| 0.922797 | 2.26E-02 | 1.40E-02 |
| 0.934361 | 2.03E-02 | 1.33E-02 |
| 0.945811 | 1.77E-02 | 1.25E-02 |
| 0.957096 | 1.49E-02 | 1.17E-02 |
| 0.968133 | 1.19E-02 | 1.08E-02 |
| 0.978789 | 8.66E-03 | 9.85E-03 |
| 0.988888 | 5.28E-03 | 8.86E-03 |
| 1 | 1.82E-03 | 7.88E-03 |

\* \* \* \* \*

UNITED STATES PATENT AND TRADEMARK OFFICE
CERTIFICATE OF CORRECTION

PATENT NO.    : 5,911,559                         Page 1 of 5
DATED         : June 15, 1999
INVENTOR(S)   : Robert W. Menthe It is certified that error appears in the above-identified patent and that said Letters Patent is hereby corrected as shown below:

The title page should be deleted to appear as per attached title page.

In the Drawings:

Delete Figures 1,2,3, and 4, and substitute the attached figures.

Signed and Sealed this

First Day of February, 2000

Attest:

Attesting Officer

Q. TODD DICKINSON

Acting Commissioner of Patents and Trademarks

/ / 

United States Patent [19]
Menthe

[11] Patent Number: 5,911,559
[45] Date of Patent: Jun. 15, 1999

[54] AIRFOILED BLADE FOR A PROPELLER

[75] Inventor: Robert W. Menthe, South Windsor, Conn.

[73] Assignee: United Technologies Corporation, Windsor Locks, Conn.

[21] Appl. No.: 08/931,406

[22] Filed: Sep. 16, 1997

[51] Int. Cl.$^6$ .................................................. B63H 1/26
[52] U.S. Cl. ...................... 416/223 R; 416/242; 416/243
[58] Field of Search ........................ 416/223 R, 242, 416/243, DIG. 5

[56] References Cited

U.S. PATENT DOCUMENTS

| | | | |
|---|---|---|---|
| 4,519,746 | 5/1985 | Wainauski et al. | 416/223 R |
| 4,652,213 | 3/1987 | Thibert et al. | 416/223 R |
| 4,773,825 | 9/1988 | Rodde et al. | 416/223 R |
| 4,830,574 | 5/1989 | Wainauski et al. | 416/223 R |
| 4,834,617 | 5/1989 | Wainauski et al. | 416/242 |
| 4,941,803 | 7/1990 | Wainauske et al. | 416/242 |
| 5,791,878 | 8/1998 | Wainauski et al. | 416/223 R |

Primary Examiner—F. Daniel Lopez
Assistant Examiner—Ninh Nguyen

[57] ABSTRACT

An airfoiled blade for improving the performance of a propeller at low aircraft speeds and for maintaining good performance of the propeller at high aircraft speeds is disclosed. The blade comprises a root portion for connection to a hub of the propeller and a tip portion defining an opposite end of the root portion. An elongated portion extends between the base portion and the tip portion and defines a leading edge and a trailing edge. The elongated portion has a cross-section defined by a scaleable airfoil section. The scaleable airfoil section comprises a chord having a fifty-percent chord station, a forward end defining the leading edge of the blade and an aft end defining the trailing edge. The airfoil section is aft end loaded for developing aft end lift. The scaleable airfoil section also has a camber distribution and a thickness distribution based therefrom. The thickness distribution defines an upper surface and a pressure surface, wherein the thickness distribution has a maximum location substantially forwardly positioned relative the fifty-percent chord station and toward the leading edge. The upper surface is designed to delay mach number build-up thereon and flow separation on the airfoil and the pressure surface is designed to prevent premature flow separation at cruise lift coefficients.

13 Claims, 3 Drawing Sheets